(12) United States Patent
Hussain et al.

(10) Patent No.: US 10,084,719 B2
(45) Date of Patent: Sep. 25, 2018

(54) SYSTEMS AND METHODS FOR HARDWARE ACCELERATED METERING FOR OPENFLOW PROTOCOL

(71) Applicant: CAVIUM, INC., San Jose, CA (US)

(72) Inventors: Muhammad Raghib Hussain, Saratoga, CA (US); Vishal Murgai, Cupertino, CA (US); Manojkumar Panicker, Sunnyvale, CA (US); Faisal Masood, San Jose, CA (US); Richard Eugene Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 224 days.

(21) Appl. No.: 14/939,982

(22) Filed: Nov. 12, 2015

(65) Prior Publication Data
US 2016/0164796 A1 Jun. 9, 2016

Related U.S. Application Data

(60) Provisional application No. 62/083,074, filed on Nov. 21, 2014.

(51) Int. Cl.
*H04L 12/863* (2013.01)
*H04L 12/841* (2013.01)
*H04L 12/721* (2013.01)
*H04L 12/741* (2013.01)

(52) U.S. Cl.
CPC .......... *H04L 47/6215* (2013.01); *H04L 45/38* (2013.01); *H04L 45/54* (2013.01); *H04L 47/28* (2013.01); *H04L 47/623* (2013.01)

(58) Field of Classification Search
None
See application file for complete search history.

(56) References Cited

U.S. PATENT DOCUMENTS

| 7,161,904 B2* | 1/2007 | Hussain | H04L 43/026 370/230 |
| 7,668,087 B2* | 2/2010 | Hussain | H04L 43/026 370/230 |
| 8,848,718 B2* | 9/2014 | Hussain | H04L 43/026 370/352 |

(Continued)

*Primary Examiner* — Ayaz Sheikh
*Assistant Examiner* — Faiyazkhan Ghafoerkhan

(57) ABSTRACT

A new approach is proposed that contemplates systems and methods to support hardware-based Quality of Service (QoS) operations, which offloads metering functionalities under OpenFlow protocol to a programmable hardware unit/block/component. The hardware unit supports several hardware implemented ports and each port supports multiple configurable queues for the packet flows through a network switch/chip/system. Specifically, the hardware unit includes a plurality of descriptor queues (DQs) configured to accept requests to send a plurality of packets from one or more CPU cores, and a plurality of condition and schedule modules configured to meter, schedule, and condition the packets through a hierarchy of scheduling queues under one or more metering constraints. The hardware unit is programmable to configure the byte-based and/or packet-based rate-limit for each of the packet flows with a calculated adjustment on allowed variations without requiring complex QoS algorithms to maintain the rate-limits of the flows.

23 Claims, 3 Drawing Sheets

(56) References Cited

U.S. PATENT DOCUMENTS

| | | | |
|---|---|---|---|
| 9,571,412 B2* | 2/2017 | Hussain | H04L 45/38 |
| 2003/0103525 A1* | 6/2003 | Wahl | H04L 47/14 |
| | | | 370/465 |
| 2003/0223361 A1* | 12/2003 | Hussain | H04L 43/026 |
| | | | 370/230 |
| 2007/0109968 A1* | 5/2007 | Hussain | H04L 43/026 |
| | | | 370/232 |
| 2008/0101354 A1* | 5/2008 | Arndt | H04L 47/10 |
| | | | 370/389 |
| 2008/0259936 A1* | 10/2008 | Hussain | H04L 45/00 |
| | | | 370/397 |
| 2009/0092147 A1* | 4/2009 | Arita | H04L 12/44 |
| | | | 370/431 |
| 2009/0225759 A1* | 9/2009 | Hussain | H04L 43/026 |
| | | | 370/395.1 |
| 2010/0220732 A1* | 9/2010 | Hussain | H04L 45/00 |
| | | | 370/395.53 |
| 2012/0057460 A1* | 3/2012 | Hussain | H04L 45/00 |
| | | | 370/235 |
| 2013/0308460 A1* | 11/2013 | Hussain | H04L 45/00 |
| | | | 370/235 |
| 2013/0336125 A1* | 12/2013 | Wang | H04L 47/215 |
| | | | 370/235.1 |
| 2014/0269319 A1* | 9/2014 | DeCusatis | H04L 47/12 |
| | | | 370/236 |
| 2015/0229567 A1* | 8/2015 | Hussain | H04L 45/00 |
| | | | 370/229 |
| 2016/0006650 A1* | 1/2016 | Song | H04L 12/6418 |
| | | | 370/329 |
| 2016/0112329 A1* | 4/2016 | Ding | H04L 12/6418 |
| | | | 370/235 |
| 2016/0191406 A1* | 6/2016 | Xiao | H04L 12/6418 |
| | | | 370/235 |

* cited by examiner

SYSTEMS AND METHODS FOR HARDWARE ACCELERATED METERING FOR OPENFLOW PROTOCOL

CROSS-REFERENCE TO RELATED APPLICATIONS

This application claims the benefit of U.S. Provisional Patent Application No. 62/083,074, filed Nov. 21, 2014, and entitled "Hardware acceleration for Openflow protocol implementation," which is incorporated herein in its entirety by reference.

This application is related to U.S. patent application Ser. No. 14/681,978, filed Apr. 8, 2015, and entitled "Systems and methods for hardware accelerated timer implementation for Openflow protocol," which is incorporated herein in its entirety by reference.

BACKGROUND

OpenFlow protocol is a communications protocol that gives a remote controller access to the packet forwarding plane of a network switch or router over the network. It enables the remote controller to determine the routing path of network packets through the network switch by adding, modifying and removing packet matching rules and actions from the packet forwarding (or flow) tables of the network switch as described below. The OpenFlow protocol separates the high level routing decision plane (control path) from the packet forwarding plane (data path) of the network switch, wherein the data path still resides on the network switch while the control path is moved to the separate remote controller, typically a standard server. The switch and the controller communicate with each other via the OpenFlow protocol, which defines types of messages, such as packet-received, send-packet-out, modify-forwarding-table, and get-stats, being exchanged between the network switch and the controller. The OpenFlow protocol thus allows for more sophisticated traffic management of the network switch than what is feasible using access control lists (ACLs) and routing protocols. In addition, OpenFlow protocol allows network switches from different suppliers—often each with its own proprietary interfaces and scripting languages—to be managed remotely using a single, open protocol.

Under the OpenFlow protocol, the data path of the network switch presents a clean flow table, wherein each flow table entry contains a set of fields that include but are not limited to, matching fields with a packet received, priority, counters, instructions for action on the packet (such as send-out-port, modify-field, or drop) based on the matching result, timeouts and cookie for the action (as shown below).

| Match fields | Priority | Counters | Instructions | Timeouts | Cookie |
|---|---|---|---|---|---|

When the network switch receives a packet it has never seen before, for which there are no matching flow table entries, it sends the packet to the controller, which then makes a decision on how to handle this packet. The controller may either drop the packet or add a flow table entry directing the network switch on how to forward similar packets in the future.

A meter measures the rate of a packet flow assigned to it and enables controlling the rate of those packets, if they exceed configured thresholds. Meters are attached directly to the flow entries (as opposed to queues which are attached to ports). Any flow entry can have an associated meter, which measures and controls the rate of the aggregate of all flow entries to which it is attached. Multiple meters can be used in the same table, but in an exclusive way (disjoint set of flow entries). Multiple meters can be used on the same set of packets by using them in successive flow tables. Under the OpenFlow protocol, a meter table includes a plurality of meter entries, which define per-flow meters that enable OpenFlow to have fine control over various simple Quality of Service (QoS) operations, such as rate-limit for each flow. Each meter entry can be identified by its meter identifier and contains the following:

| Meter Identifier | Meter Bands | Counters |
|---|---|---|

Here, the Meter Identifier is a 32 bit unsigned integer, the Meter bands is an unordered list of meter bands, where each meter band specifies the rate of the band and the way to process the packet, and counters is updated when packets are processed by the meter.

Implementing QoS metering in software adds burden on system resources (CPU, memory etc.) as metering and rate-limiting for several hundreds of thousand/million flow entries can be extremely complex and hard on the system resources. Guaranteeing accuracy of the rate-limits and each flow adhering to the strict QoS rate-limits puts heavy load of CPU, memory and other internal system resources, and is error prone. Incorrect rate-limit could impact network serviceability for the applications sharing the corresponding network bandwidth. Therefore, there is a need for an improved system and method to enable accelerated metering implementation under the OpenFlow protocol.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
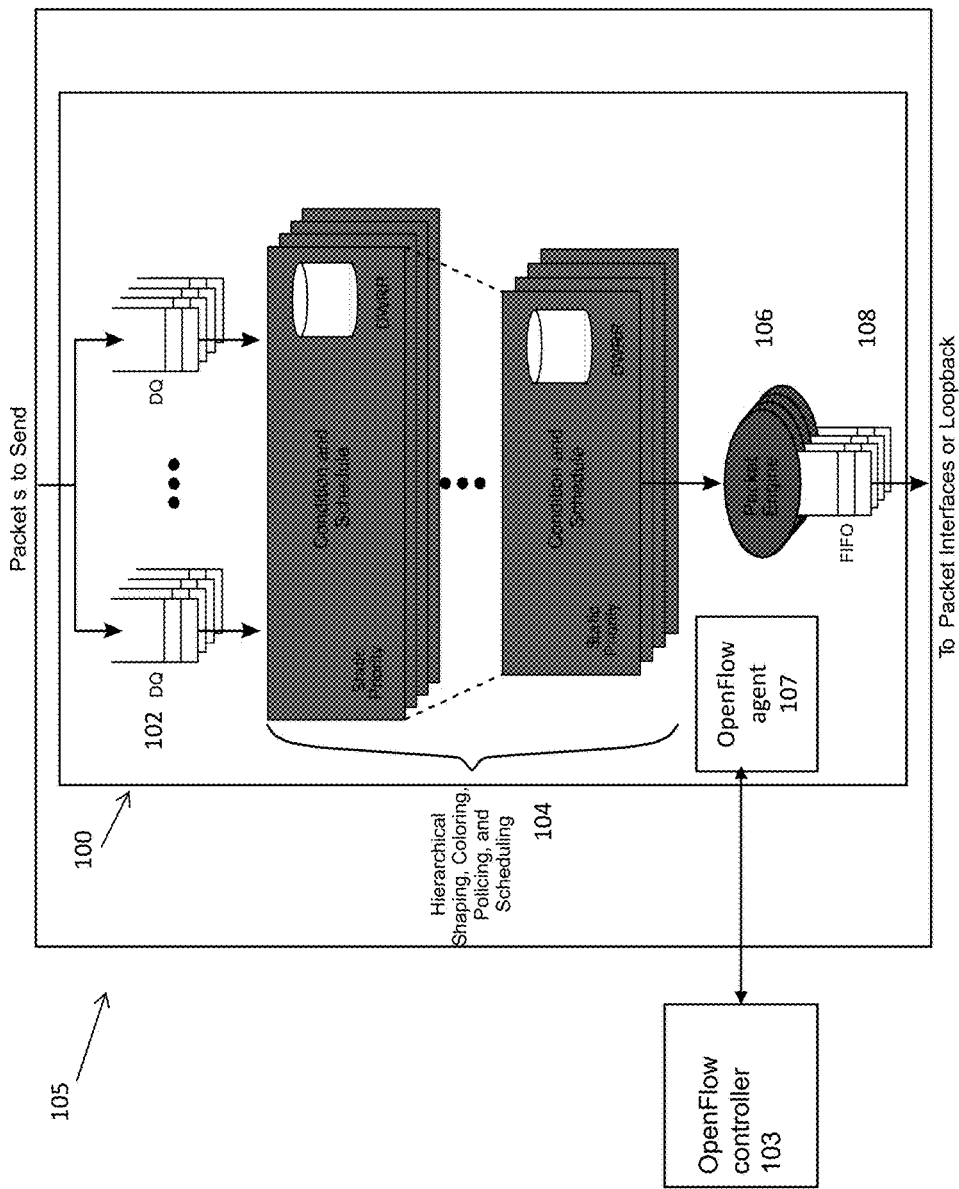
FIG. 1 depicts an example of a diagram of a packet-output processing (PKO) engine configured to support hardware accelerated metering implementation under OpenFlow protocol in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support hardware-based Quality of Service (QoS) operations, which offloads metering functionalities under OpenFlow protocol to a programmable hardware unit/block/component. The hardware unit supports several hardware implemented ports and each port supports multiple configurable queues for the packet flows through a network switch/chip/system. Specifically, the hardware unit includes a plurality of descriptor queues (DQs) configured to accept requests to send a plurality of packets from one or more CPU cores, and a plurality of condition and schedule modules configured to meter, schedule, and condition the packets through a hierarchy of scheduling queues under one or more metering constraints. The hardware unit is programmable to configure the byte-based and/or packet-based rate-limit for each of the packet flows with a calculated adjustment on allowed variations without requiring complex QoS algorithms to maintain the rate-limits of the flows by software.

By offloading the configuration and maintenance of the rate-limits of the packet flows of the network switch to a hardware unit, the proposed approach enables hardware accelerated implementation of metering and rate-limiting under OpenFlow protocol. Such hardware accelerated implementation eliminates the heavy load imposed on the CPU/memory resources of the system caused by maintaining rate-limits for, in some cases, hundreds of thousands/ millions of flows through the network switch under software implementation. As a result, the proposed approach improves the accuracy and predictability of QoS metering even when a huge number of flows are processed by the network switch at approximately the same time. With the hardware-based metering-offload, the CPU/memory resources of the system could be utilized for other mission critical tasks, and accuracy of metering of the flows through the network switch can be improved.

FIG. 1 depicts an example of a diagram of a packet-output processing (PKO) engine configured to support hardware accelerated metering implementation under OpenFlow protocol. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the packet-output processing (PKO) engine 100 is a hardware-based, software-programmable metering unit implemented on a hardware unit 105. Here, the hardware unit can be part of on a multi-core embedded hardware module or SoC comprising one or more of coprocessors/hardware cores, a memory (also referred to as primary memory) such as RAM, and a storage unit such as a non-volatile memory (also referred to as secondary memory) with software instructions stored in for practicing one or more processes. For non-limiting examples, the hardware unit 105 may be part of x86, OCTEON, MIPS, and/or ARM based systems/cores/servers that utilize hardware for Openflow metering acceleration.

In the example of FIG. 1, the packet-output processing (PKO) engine 100 includes at least a plurality of descriptor queues (DQs) 102, a plurality of condition and schedule modules 104, a plurality of packet engines 106, and a plurality of first-in-first-out (FIFO) output queues 108. In some embodiments, each component in a meter table entry discussed above can be mapped to components in the PKO engine 100. For example, the meter identifier that is associated with and uniquely identifies a flow of packets through the switch can be mapped to one of the DQs 102, while the meter band that specifies the rate of the band and the way to process the packet, and the counter that is updated when packets are processed by a meter can be mapped to one of the condition and schedule modules 104.

In some embodiments, an optional OpenFlow controller 103 is utilized to communicate with, control, and configure various OpenFlow parameters using an OpenFlow agent 107, which is a software component running on the PKO engine 100. The OpenFlow agent 107 is in-turn, configured to program and configure the PKO engine 100. In some embodiments, the OpenFlow controller 103 runs on x86, OCTEON and/or ARM based systems/cores/servers. The OpenFlow controller 103 and the PKO engine 100 communicate with each other and other devices/hosts/servers over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In some embodiments, each of the DQs 102 and the condition and schedule modules 104 can be programmed using the OpenFlow controller 103 to support a specific QoS metering function/behavior, such as rate-limit on the flow. Here, different DQs 102 and condition and schedule modules 104 can be programmed to support different byte-based and/or packet-based rate-limits on different flows, wherein each of the packet flows may have its own calculated adjustment on allowed variations. In some embodiments, the OpenFlow controller 103 is configured to enable flexible memory write, memory atomic update, and/or notification mechanism for each of the packet flows, and to allocate and return memories and storage spaces taken by the DQs 102 and the condition and schedule modules 104 as needed.

Figure 2:
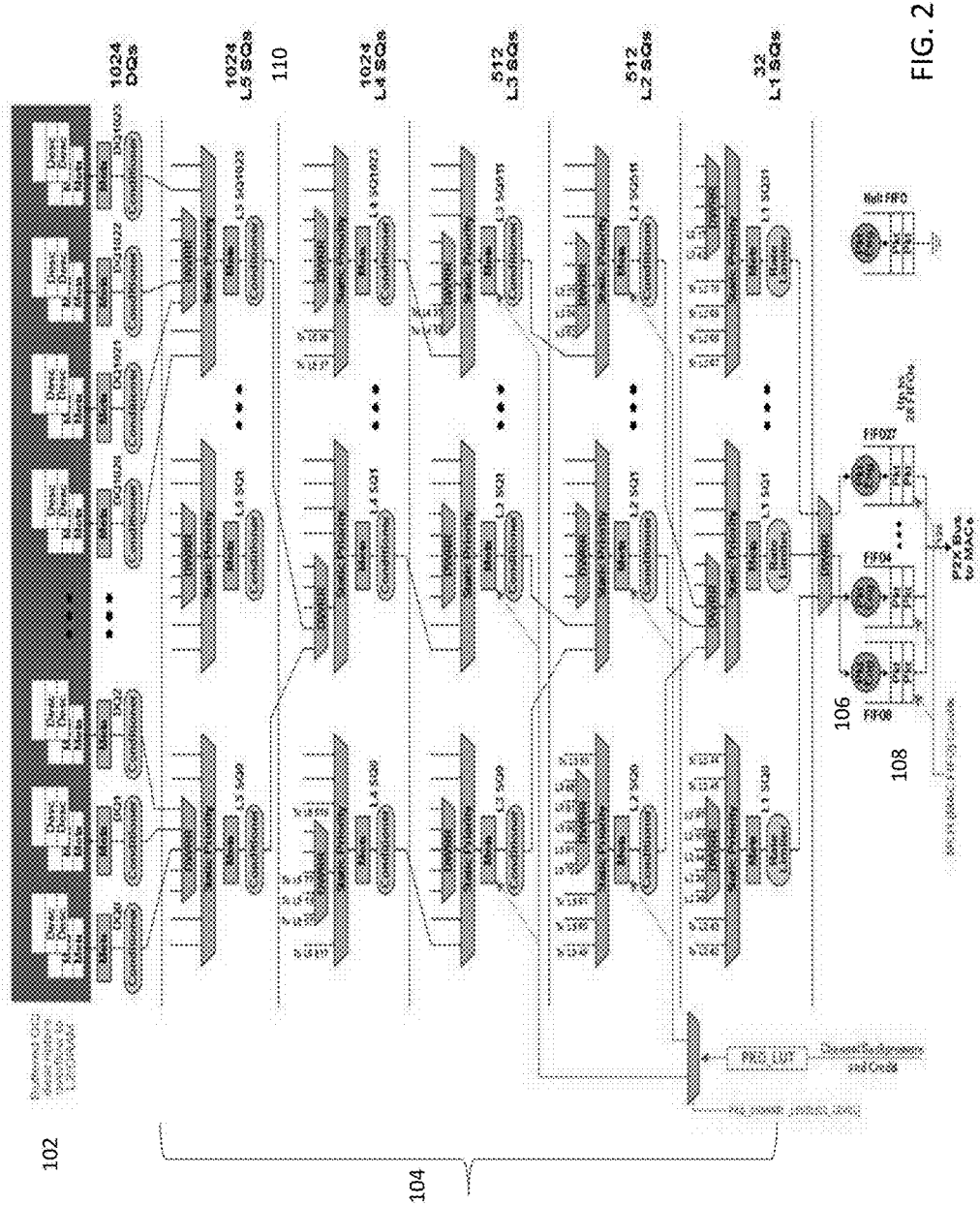
FIG. 2 depicts an example of the internal hardware implementation and configuration of the PKO engine depicted in FIG. 1 in accordance with some embodiments.

FIG. 2 depicts an example of the internal hardware implementation and configuration of the PKO engine 100 depicted in FIG. 1. As shown in the example of FIG. 2, the condition and schedule modules 104 of the PKO engine 100 are configured to schedule the packets into a multi-level hierarchy of scheduling queues (SQs) 110, e.g., L1-L5, between the DQs 102 and the FIFO output queues 108, wherein the topology of the hierarchy of the SQs 110 is in accordance with the QoS/traffic management profile for the application of the PKO engine 100. Such multi-level packet scheduling ensures that the PKO engine 100 transfers packets in a way that meet the rate-limits on the packet flows to avoid excessive packet queuing and/or packet dropping in devices in the system or network outside the hardware unit.

In some embodiments, the condition and schedule modules 104 are configured to hierarchically shape (e.g., adjust the size of the packet flows), conform (e.g., to make sure that each queue does not exceed its allowed bandwidth or transmission rate limits), and color the packet flows under one or more metering constraints. In some embodiments, the condition and schedule modules 104 are configured to adopt a two-rate three-color marker/metering (trTCM) scheme, which meters a packet flow and marks its packets based on two rates, peak information rate (PIR) and committed information rate (CIR), and their associated burst sizes to be either green, yellow, or red. A packet is marked red if it exceeds the PIR. Otherwise it is marked either yellow or green depending on whether it exceeds the CIR or not. The trTCM scheme is useful, for example, for ingress policing of a metering function where a peak rate needs to be enforced separately from a committed rate. In some embodiments, when the excess information rate (EIR) of a DQ 102 of a packet flow, which equals to the difference between PIR and CIR, exceeds certain threshold, the packets are colored red. The corresponding condition and schedule module 104 is optionally configured to mark a packet flow based on the final packet color, and to either drop the packet flow, wait to process the corresponding DQ 102, or continue to send the packet flow.

In some embodiments, the condition and schedule modules 104 are configured to adopt user-specified static priority levels for scheduling the packets having green, yellow, or red colors. In some embodiments, the condition and schedule modules 104 are configured to adopt deficit weighted round robin (DWRR) scheme for the scheduling of the colored packets, wherein each packet flow is limited to be no more than a user-specified threshold in terms of bytes or number of packets in the current round, and the remaining packets in the flow, if any, is delayed to the next round. Such scheme helps to achieve a minimal long term data rate for each packet flow to avoid packet drops.

In some embodiments, the condition and schedule modules 104 are configured to adopt channel-level backpressure routing to set thresholds on hardware channels and packet and/or byte count to limit output from the packet engines 106 and the FIFO output queues 108. Here, the channel-level backpressure directs packet traffic around different scheduling queues in the multi-level hierarchy shown in FIG. 2 using concepts of Lyapunov drift in order to achieve maximum network throughput for the PKO engine 100.

During its operations, the PKO engine 100 is configured to accept and queue a plurality of descriptors, which are requests to send packet flows received from the CPU cores into the plurality of DQs 102. To process the descriptors in the DQs 102, the condition and schedule modules 104 are configured to collect packets of the descriptors from memories (e.g., L2/DRAM). The condition and schedule modules 104 are then configured to schedule and condition (e.g. shape, conform, or resize) the packets for routing through a hierarchy of scheduling queues before sending them to the packet output engines 106, wherein the packet output engines 106 are configured to queue the conditioned packets to the corresponding FIFO output queues 108 for delivery out of the system/switch to their destinations or loop back for further processing.

Figure 3:
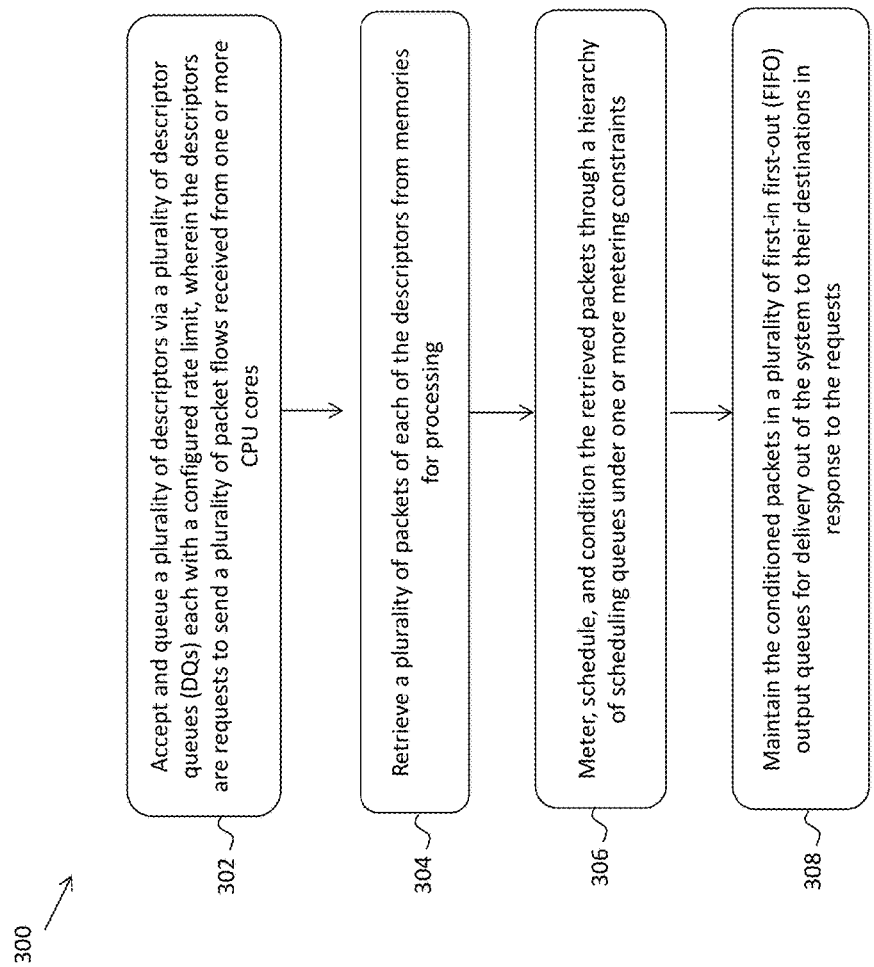
FIG. 3 depicts a flowchart of an example of a process to support hardware accelerated metering implementation under OpenFlow protocol in accordance with some embodiments.

FIG. 3 depicts a flowchart of an example of a process to support hardware accelerated metering implementation under OpenFlow protocol. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where a plurality of descriptors, which are requests to send a plurality of packet flows received from one or more CPU cores, are accepted and queued in a plurality of descriptor queues (DQs) with configured rate limits. The flowchart 300 continues to block 304, where a plurality of packets of each of the descriptors are retrieved from memories for processing. The flowchart 300 continues to block 306, where the retrieved packets are metered, scheduled and conditioned through a hierarchy of scheduling queues under one or more metering constraints. The flowchart 300 continues to block 308, where the conditioned packets are maintained in a plurality of first-in first-out (FIFO) output queues for delivery out of the system to their destinations in response to the requests.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support hardware accelerated metering implementation under OpenFlow protocol, comprising:
   a hardware packet-output processing (PKO) engine further comprising:
      a plurality of descriptor queues (DQs) each DQ being mapped to a meter identifier that uniquely identifies a flow of packets and a corresponding packet flow rate limit, each DQ configured to accept and queue a plurality of descriptors, which are requests to send a plurality of packet flows received from one or more CPU cores under OpenFlow protocol;
      a plurality of condition and schedule modules each configured to retrieve a plurality of packets of each of the plurality of descriptors from memories for processing;

meter, schedule, and condition the retrieved packets through a multi-level hierarchy of scheduling queues under one or more metering constraints;

maintain the conditioned packets in a plurality of first-in first-out (FIFO) output queues for delivery out of the system to their destinations in response to the requests.

2. The system of claim 1, wherein:
the hardware PKO engine is an embedded hardware module.

3. The system of claim 1, further comprising:
an OpenFlow controller configured to translate and program each of the plurality of DQs and the condition and schedule modules via a software agent running on the PKO engine to configure the metering and the packet flow rate limit.

4. The system of claim 3, wherein:
the OpenFlow controller is configured to program different byte-based and/or packet-based rate-limits on different packet flows, wherein each of the plurality of packet flows has its own calculated adjustment on allowed variations.

5. The system of claim 3, wherein:
the OpenFlow controller is configured to enable flexible memory write, memory atomic update, and/or notification mechanism for each of the plurality of packet flows, and to allocate and return memories and storage spaces taken by the plurality of DQs and the condition and schedule modules.

6. The system of claim 1, wherein:
the condition and schedule modules are configured to schedule the packet flows in a way that meet the rate-limits on the packet flows to avoid excessive packet queuing and/or packet dropping via the multi-level hierarchy of scheduling queues.

7. The system of claim 1, wherein:
the condition and schedule modules are configured to hierarchically color and/or adjust a size of the plurality of packet flows under the one or more metering constraints.

8. The system of claim 7, wherein:
the condition and schedule modules are configured to adopt a two-rate three-color metering (trTCM) scheme, which meters a packet flow and marks its packets based on two rates, peak information rate (PIR) and committed information rate (CIR), and their associated burst sizes to be either green, yellow, or red.

9. The system of claim 8, wherein:
the condition and schedule modules are configured to mark the packet flow based on the final packet color, and to either drop the packet flow, wait to process the corresponding DQ, or continue to send the packet flow.

10. The system of claim 7, wherein:
the condition and schedule modules are configured to adopt user-specified static priority levels for scheduling the packets based on their colors.

11. The system of claim 7, wherein:
the condition and schedule modules are configured to adopt deficit weighted round robin (DWRR) scheme for the scheduling of the colored packets, wherein each packet flow is limited to be no more than a user-specified threshold in terms of bytes or number of packets to achieve a minimal long term data rate for each packet flow to avoid packet drops.

12. The system of claim 1, wherein:
the condition and schedule modules are configured to adopt channel-level backpressure routing to set thresholds on hardware channel and/or packet and byte count to limit output from the FIFO output queues.

13. A method to support hardware accelerated metering implementation under OpenFlow protocol, comprising:
accepting and queuing a plurality of descriptors via a plurality of descriptor queues (DQs), each DQ being mapped to a meter identifier that uniquely identifies a flow of packets and a corresponding packet flow rate limit, wherein the plurality of descriptors are requests to send a plurality of packet flows received from one or more CPU cores under OpenFlow protocol;

retrieving a plurality of packets of each of the plurality of descriptors from memories for processing;

metering, scheduling, and conditioning the retrieved plurality of packets through a hierarchy of scheduling queues under one or more metering constraints via a plurality of condition and schedule modules;

maintaining the conditioned plurality of packets in a plurality of first-in first-out (FIFO) output queues for delivery out of the system to their destinations in response to the requests.

14. The method of claim 13, further comprising:
translating and programming each of the plurality of DQs and the condition and schedule modules to configure the metering and the packet flow rate limit.

15. The method of claim 14, further comprising:
programming different byte-based and/or packet-based rate-limits on different packet flows, wherein each of the plurality of packet flows has its own calculated adjustment on allowed variations.

16. The method of claim 14, further comprising:
enabling flexible memory write, memory atomic update, and/or notification mechanism for each of the plurality of packet flows, and to allocate and return memories and storage spaces taken by the plurality of DQs and the condition and schedule modules.

17. The method of claim 13, further comprising:
scheduling the plurality of packet flows in a way that meet the rate-limits on the plurality of packet flows to avoid excessive packet queuing and/or packet dropping via the multi-level hierarchy of scheduling queues.

18. The method of claim 13, further comprising:
hierarchically coloring and/or adjusting a size of the plurality of packet flows under the one or more metering constraints.

19. The method of claim 18, further comprising:
adopting a two-rate three-color metering (trTCM) scheme, which meters a packet flow and marks its packets based on two rates, peak information rate (PIR) and committed information rate (CIR), and their associated burst sizes to be either green, yellow, or red.

20. The method of claim 19, further comprising:
marking the packet flow based on the final packet color, and to either drop the packet flow, wait to process the corresponding DQ, or continue to send the packet flow.

21. The method of claim 18, further comprising:
adopting user-specified static priority levels for scheduling the packets based on their colors.

22. The method of claim 18, further comprising:
adopting deficit weighted round robin (DWRR) scheme for the scheduling of the colored packets, wherein each packet flow is limited to be no more than a user-specified threshold in terms of bytes or number of packets to achieve a minimal long term data rate for each packet flow to avoid packet drops.

23. The method of claim 18, further comprising:
adopting channel-level backpressure routing to set thresholds on hardware channel and/or packet and byte count to limit output from the FIFO output queues.

* * * * *